FIG. 1-A.

INVENTORS
L. F. Dasse
F. D. Griswold
BY
Robbss Cobb
ATTORNEYS

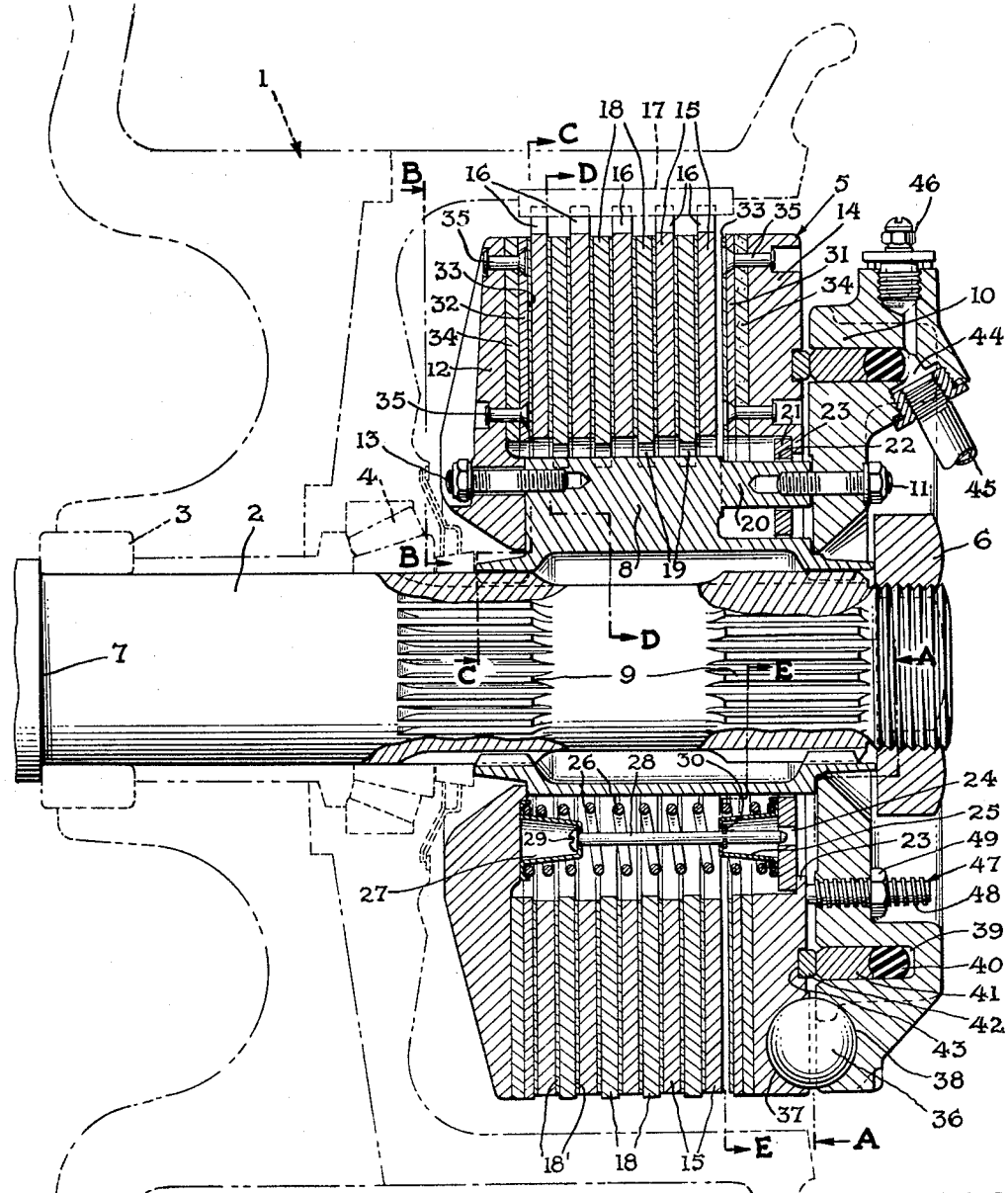

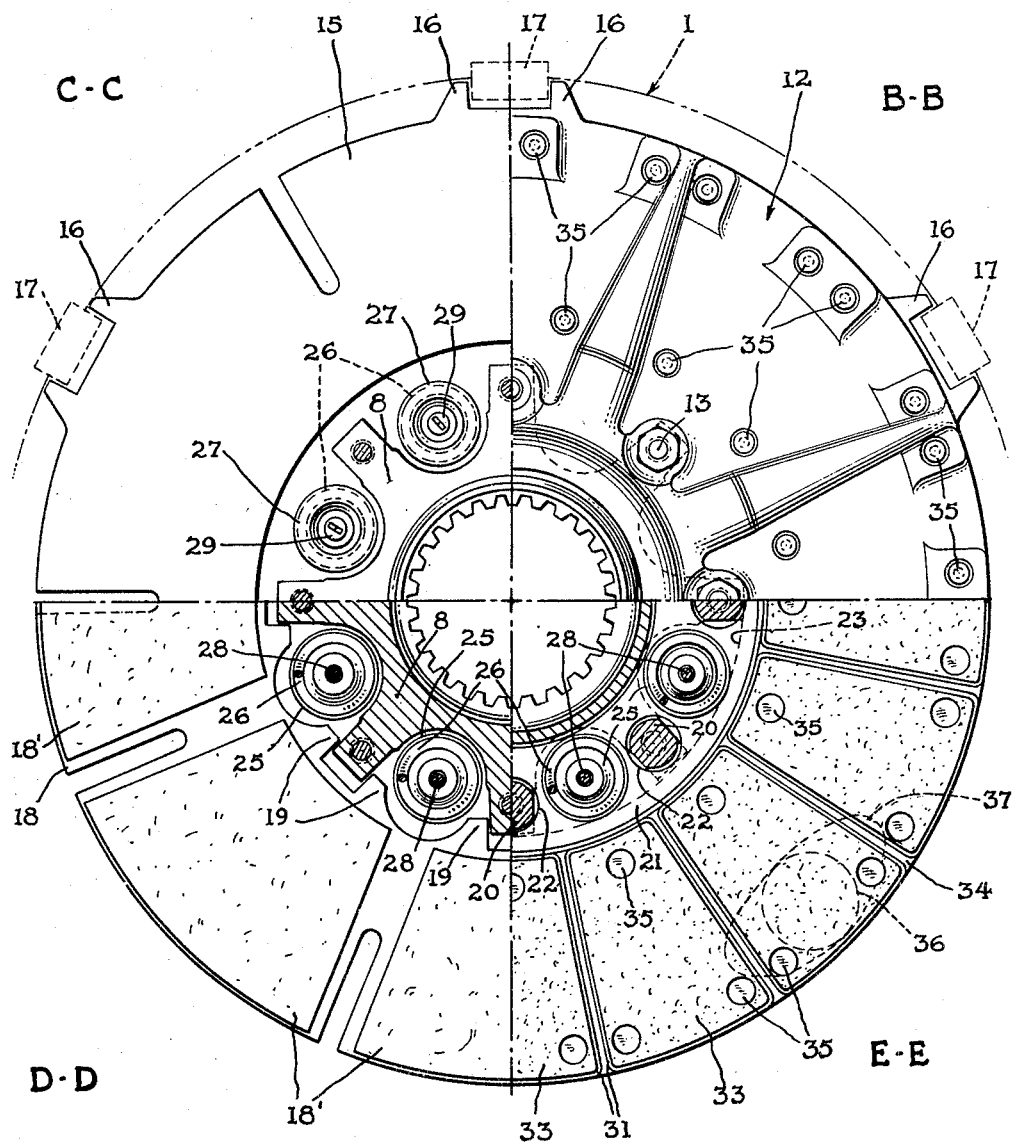

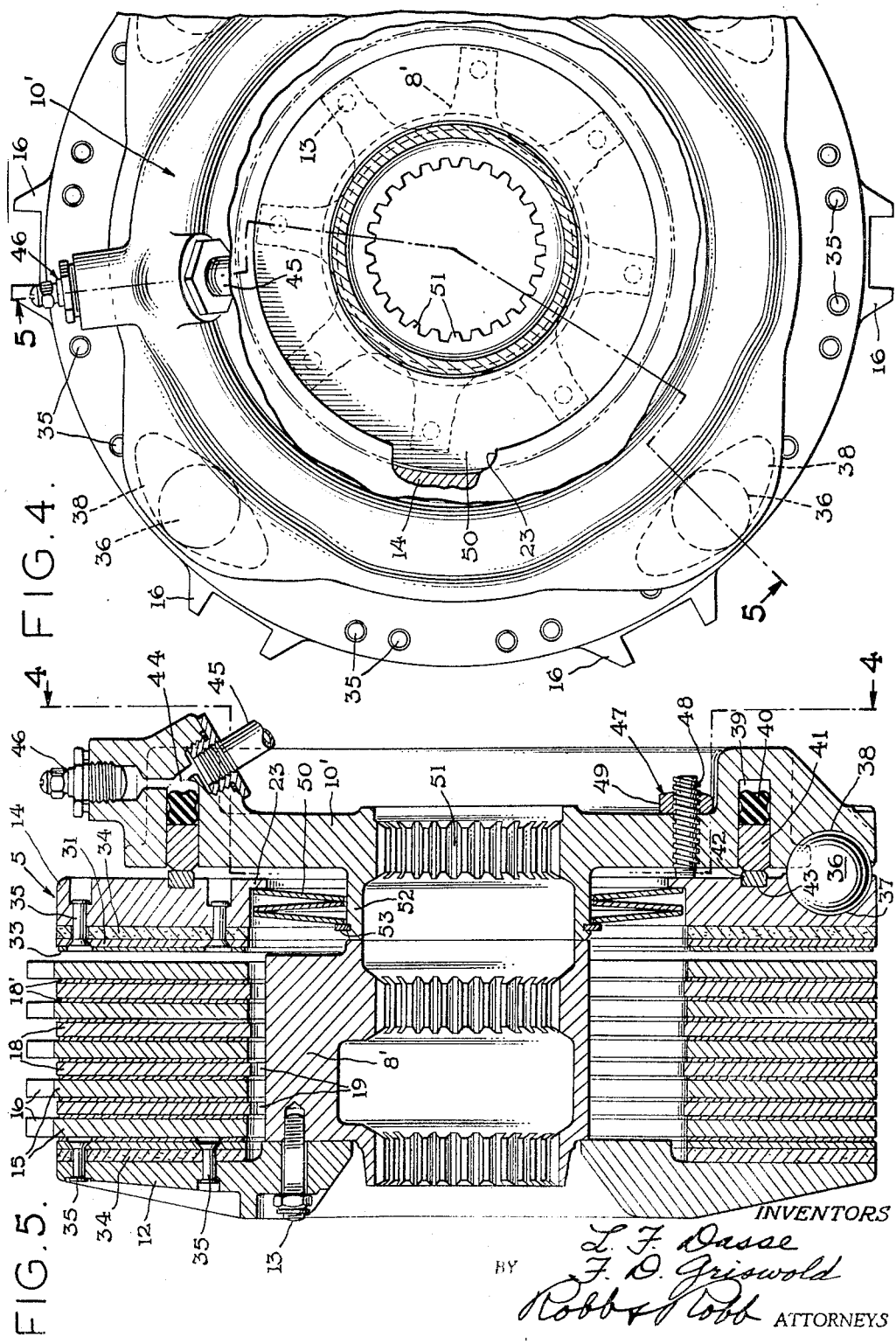

017# United States Patent Office 2,916,105
Patented Dec. 8, 1959

2,916,105

SELF-ENERGIZING DISC BRAKE FOR HIGH-SPEED AIRCRAFT AND OTHER HEAVY DUTY USES

Lester F. Dasse and Frederick D. Griswold, St. Joseph, Mich., assignors, by mesne assignments, to Lambert Brake Corporation, St. Joseph, Mich., a corporation of Michigan Application November 20, 1956, Serial No. 623,358

15 Claims. (Cl. 188—72)

The present invention relates to self-energizing disc brakes for high-speed aircraft, such as jet planes and the like, and for other heavy duty and/or high-speed uses. More particularly, the invention is concerned with brakes which are primarily, but not solely, intended for use where certain critical factors are present and must be adequately met and fulfilled.

Heretofore, no self-energizing or servo brake has completely fulfilled the essential requirements for modern jet aircraft and similar high-speed and/or heavy duty uses. The present invention is eminently suited for such purposes.

First and foremost, brake energization, according to the present invention, is accomplished by means of torque-sensing mechanical elements which produce a powerful, positive and safe braking action which is attended by exceedingly smooth operation that is evidenced by the lack of peak torque values at all ranges of speeds. Upon initial brake application at any speed, the torque build-up is never abrupt, and this is particularly evident at high touchdown aircraft speeds where smooth operation is essential to minimize any tendency to induce tire skids, and to compensate for so-called "panic" over-pressurization of the brake system. Hence, our improved brake is more compatible with pilot reaction time, but this cannot be construed as a brake torque lag.

A further objective of our invention is to provide a brake which does not exhibit any detrimental vibration tendencies. Because the energization is torque-sensitive, it tends to act as a muffle to the normal vibrations induced by lining coefficient variations, thereby minimizing or eliminating mechanical troubles such as rotor and stator torque-lug-battering and the like.

Another objective of the invention is to provide a brake embodying simplified, yet highly effective, rotor and stator plate or disc elements. This objective is attained by the use of sintered metallic linings which are brazed directly to the plates or discs during the sintering operation. Even in small thicknesses ranging between 0.070 inch to 0.035 inch, such linings have a high thermal conductivity, and both the rotor and stator act equally well as "heat sink" members, and the heavy stack members may therefore be effectively utilized as a heat reservoir which materially contributes to low brake weight for a given energy input. Since the sintered linings require no provision for mechanical or other separate attachment to the respective friction plates or discs of the brake, the linings may be worn down to the base metal over a large percentage of the swept area before any noticeable effect on performance requires relining or replacement of the discs. Moreover, the sintered metal linings have a low wear rate at normal loadings, with a consequent low complete brake wear cycle. This admits of the practical omission of automatic brake adjusters and the use of simple manual adjustment provisions, although automatic adjusters can be readily employed if desired.

A further objective of the invention is to provide a brake of the aforementioned character which is so constructed and arranged as to permit the use of light metal structural members within the brake, while at the same time, employing high-temperature alloys and appropriate insulation to keep heat transfer within safe limits and prevent heat transfer to critical zones such as the hydraulic elements of the brake.

Yet another objective is to preserve a simplicity of construction and design which minimizes maintenance service and repair, requires little time for field service, and few, if any, special tools for servicing operations.

In spite of the aforementioned features, the brake of the present invention is capable of weight savings in its component parts which insures an over-all weight within acceptable limits and which is comparable to or less than other brakes heretofore in use but which are lacking in one or more advantages of the brake of this invention.

A still further objective of the invention is to provide an improved brake-releasing means which insures effective release of the brake, particularly after being subjected to heavy torque loads which are common in modern jet aircraft. Prior hereto, brake release has usually been accomplished by compression or expansion springs impinging upon or fastened to the primary disc in such a manner that the springs are required to "clock" on application and release of the brake, sometimes resulting in inadequate spring pressure to properly release the brake. Where space limitations are critical or of paramount importance, the improved brake releasing means of the present invention is a definite advantage and insures effective and proper release of the brake at all times, and permits the use of non-clocking springs which have movement in an axial direction only.

In addition to the foregoing objectives, the invention is further characterized by the use of a stationary housing assembly having a new and improved relationship to the other component parts of the brake, and which admits of the advantageous mounting of the brake as an outboard type of brake, as well as quick and easy removal and/or replacement of the brake assembly as a unit.

Other and further objects and advantages of the invention will be hereinafter described and the novel features thereof defined in the appended claims.

In the drawings:

Fig. 1A is a fragmentary sectional view as taken on line 1A—1A of Fig. 1 through one of the energizing ball seats, with its associated ball shown in elevation;

Fig. 2 is a sectional view through the brake assembly as taken on the line 2—2 of Fig. 1 and showing the brake in mounted relationship to a typical aircraft wheel assembly, with the wheel represented in broken outline;

Fig. 3 is a composite sectional view taken on the respective section lines B—B, C—C, D—D and E—E of Fig. 2, with the respective composite sections represented by correspondingly designated quadrants, as observed from the inboard side of the brake;

Fig. 4 is a fragmentary view generally corresponding to Fig. 1, showing a modified form of the brake, with certain parts broken away and others shown in section, as taken substantially on line 4—4 of Fig. 5; and Fig. 5 is a sectional view similar to Fig. 2, as taken on the line 5—5 of Fig. 4, with the wheel and axle omitted.

Figure 1:
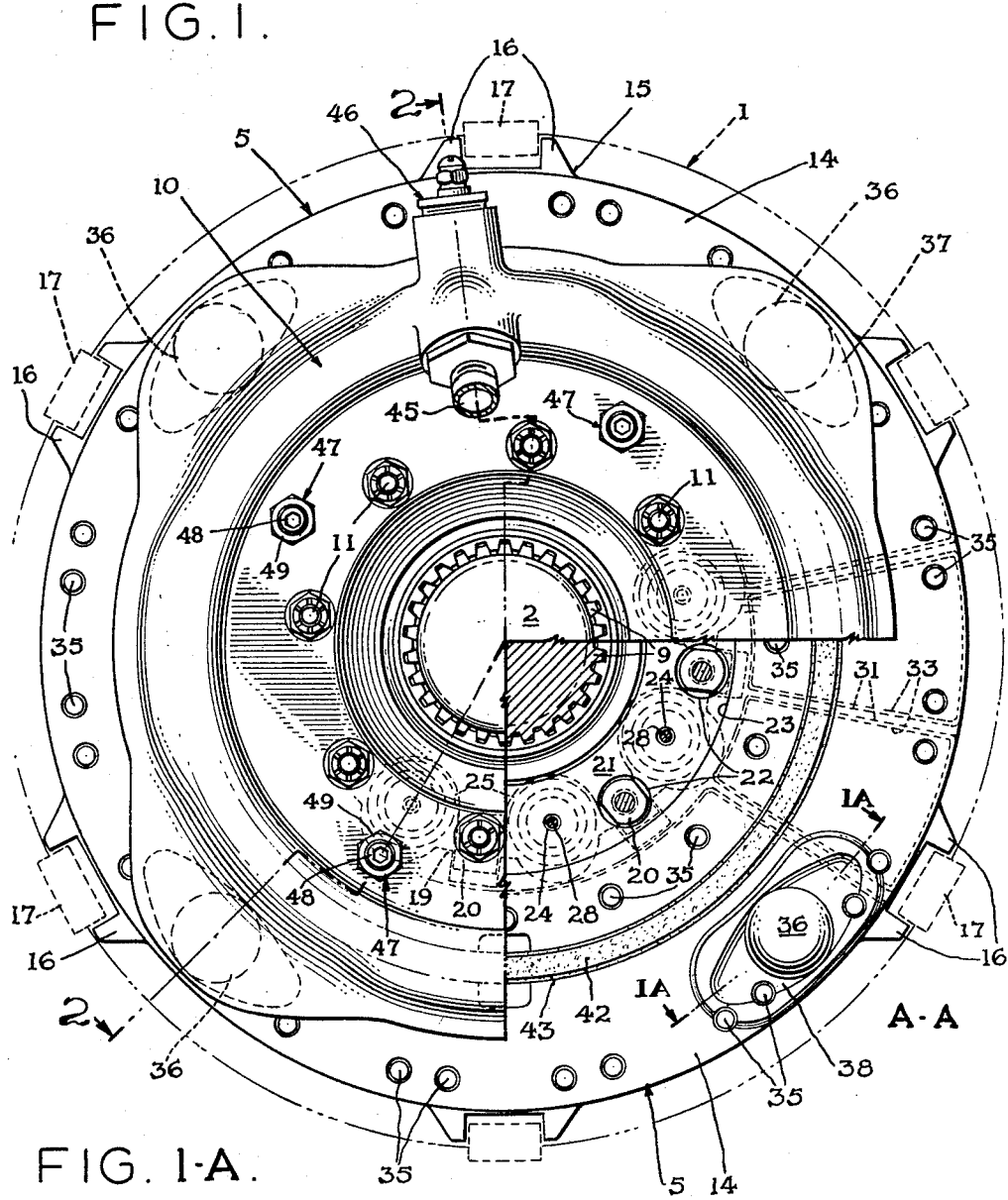
Fig. 1 is a view of a brake according to the present invention, as seen in front or outboard elevation, with certain of the parts broken away on the section line A—A of Fig. 2 and others shown in section.

Like reference characters designate corresponding parts in the several figures of the drawings, wherein 1 generally denotes a wheel of a type commonly utilized in the landing gear of jet aircraft. It is to be understood, however, that our invention is not limited to aircraft wheel brakes, since it is equally well adapted to other vehicle wheels, as well as to friction devices in general for transmitting or absorbing torque.

According to the arrangement shown in Figs. 1 to 3 inclusive of the drawings, which should be considered as illustrative of one practical embodiment of the invention, the wheel 1 is suitably mounted upon a rigid supporting axle or stub shaft 2, with appropriate bearings 3 and 4 disposed between the axle and the wheel. Preferably recessed in the wheel 1, and disposed at the outboard side of the wheel, is the brake assembly which is generally designated 5, said brake assembly preferably being so constructed and arranged as to be quickly and easily applied onto the outer end of the axle and removable therefrom as a unit. Any suitable means may be employed for retaining the brake unit and wheel on the axle, such as a nut 6 which is threadedly engaged with the outer extremity of the axle and exerts a clamping action relative to a shoulder 7 formed at the inboard end of the axle, as best seen in Fig. 2.

The brake assembly preferably includes an interiorly splined torque hub 8 which is easily slidable onto the splines 9, formed on the axle 2 near the outboard end thereof. The splined mounting of the torque hub 8 on the axle precludes rotation of the hub, and the hub therefore remains relatively stationary. Suitably interconnected with the torque hub 8 to form therewith a housing assembly, so-called, is a power plate generally designated 10 which is removably fixed to the torque hub by appropriate stud bolts 11 or other suitable fastenings, and also a secondary disc or plate 12 which is likewise rigidly but removably or detachably secured to the opposite inboard end of the torque hub by stud bolts 13 or the like.

Interposed between the power plate 10 and the secondary disc 12 is a primary actuator disc or plate 14 which loosely encircles the torque hub 8 and is axially movable towards and away from the power plate, as will hereinafter more fully appear. Interposed between the primary disc 14 and secondary disc 12 is a plurality of rotor discs or plates designated 15, these discs being keyed or splined at their outer peripheries to the wheel 1 as by means of circumferentially spaced sets of torque lugs or ears 16 slidably interengaging circumferentially spaced and axially extended keys or lugs 17 mounted within the wheel 1 and fixed thereto. Alternate intermediate stator plates or discs 18 are assembled between the rotor discs 15 to compose a pack of friction discs, said stator discs being suitably splined or keyed to the stationary torque hub 8 as by means of torque lugs or ears 19 so as to preclude rotation of the stator discs, but allowing axial movement of the stator discs on the torque hub, the rotor discs 15 likewise being axially movable on the keys 17.

The hub is appropriately milled or otherwise formed to provide a plurality of axially extended recesses or grooves defined by axially and outwardly projecting lugs of generally circular cross-section at their outboard ends, as indicated at 20. Slidably mounted on the lugs 20 is a spring retainer ring 21, said ring being suitably provided with a plurality of apertures 22 so as to permit the ring to be applied onto the end of the torque hub 8 and allow the ring to axially move relative thereto.

The inner periphery of the primary disc 14 lightly pilots on ring 21 and is provided with an inwardly extended flange 23 which forms a shoulder against which the outboard face of the ring 21 is adapted to abut. Intermediate the lugs 20 on the torque hub 8, the spring retainer ring 21 is apertured at spaced intervals at 24, and seated against the inboard face of the ring in coaxial relation to each aperture 24 is a spring cap designated 25 over which is seated one end of a coil spring 26. Disposed in opposed relation to each spring cap 25 and seating in a recess in the outboard face of the secondary disc 12 is another spring cap 27 over which the opposite end of the respective springs 26 seats. Extending through each pair of opposed spring caps 25, 27 is a tie pin 28, said pin having a head 29 on one end which seats within the spring cap 27, and having a snap ring or clip 30 secured thereon near its opposite end and seating within the opposed spring cap 25. The extreme outboard end of each tie pin 28 is aligned with an aperture 24 in the ring 21, said aperture being somewhat larger than the pin so as to allow the pin to freely protrude through the aperture on compression of the coil spring 26.

In the spring assemblies described in the foregoing, the springs are axially fixed in the sense that they are cradled between the adjacent axially extended lugs 20 within hub 8 and are restrained against "clocking" during energization and release of the brake by virtue of this arrangement and of the fact that the spring retainer ring 21 is mechanically interlocked with the lugs 20 on the stationary torque hub 8. However, the ring 21, being free to move axially on the lugs 20 of the torque hub 8, permits the springs to compress and expand axially responsive to movement of the primary disc 14 towards and away from the secondary disc 12 during the braking action and release of the brake, respectively.

In order to afford the required or desired friction action in the brake, both the primary disc 14 and the secondary disc 12 are preferably provided with facing segments respectively designated 31 and 32, said segments preferably being provided on their inner faces with sintered metallic linings 33. Intermediate the segments 31, 32, suitable heat insulating members 34 are provided, and the heat insulating members and the lining facing segments are attached to the respective discs 12 and 14 by any appropriate fastening means such as rivets 35.

The stator discs or plates 18 are also each preferably provided with sintered metallic linings on the opposed faces thereof, as indicated at 18′, which has the advantage of insuring effective braking action, high thermal conductivity and long wear of the friction elements of the brake. The complete disc pack accordingly functions as a heat reservoir and maintains the brake temperature within safe limits even under conditions of high-speed and/or heavy duty brake operation such as prevail in jet aircraft.

Disposed between the power plate 10 and the primary disc 14 is a plurality of steel balls 36 which seat in oppositely inclined ramped seats 37 and 38 formed, generated or otherwise appropriately provided in the respective members 14 and 10. The purpose of these balls is not only to help pilot the primary disc but also to produce a self-energizing action in the brake, and thereby make the brake torque-sensitive. As the result, on initial engagement of the primary disc 14 with the pack of interleaved friction members 15 and 18 which lie between the primary disc 14 and secondary disc 12, the primary disc is subjected to a drag torque tending to impart rotation thereto from the wheel 1. This tendency of the primary disc 14 to rotate with the wheel causes the balls 36 to roll on the ramped seats and thereby create a camming action which results in causing a powerful thrust to be exerted by the primary disc against the friction pack and the secondary disc 12, this thrust being proportionate to the load on the brake.

In order to initiate operation of the brake, any appropriate means may be employed to produce the initial engagement of the primary disc 14 with the friction pack aforementioned. Illustrative of one means for this purpose is the hydraulic means shown in the drawings. As best seen in Fig. 2, the power plate 10 is provided with an annular piston chamber 39 in which is disposed a resilient sealing ring 40 and an annular piston 41 which is disposed towards the inboard side of the sealing ring 40. Preferably interposed between the piston 41 and the primary disc 14 is a heat insulating ring 42 which serves to minimize the transfer of heat from the friction elements of the brake to the hydraulic brake operating instrumentalities. In order to maintain the insulating ring 42 in general alignment with the piston 41, the former is preferably seated in an annular recess 43 formed in the outboard face of the primary disc 14.

The power plate 10 is provided at its outboard side with an inlet port 44 which communicates with the piston chamber 39 to admit hydraulic pressure fluid derived from any appropriate source and connected to the inlet port 44 by a conduit 45. As is customary in hydraulic brake systems, a bleed valve 46 of any suitable type is provided to permit the brake to be bled as and when desired.

When hydraulic fluid is admitted under pressure into the piston chamber 39, the piston 41 will exert an axial thrust against the insulating ring 42, and consequently against the primary disc 14 until the primary disc initially engages the friction pack. Thereafter, the brake-applying thrust of the primary disc is increased substantially by the self-energizing action of the balls 36 and their ramped seats which produce the camming action aforementioned in response to slight rotation of the primary disc under the influence of the drag torque imparted thereto by the wheel 1.

Due to the long-wearing qualities of the brake construction as hereinbefore described, it is not essential to provide automatic adjusters for the brake, although it is to be understood that such automatic adjusters may be used if preferred, such adjusters being now well-known in the art. In lieu of automatic adjusters, it has been found that a simple mechanical adjuster will suffice, and in Fig. 2 there has been illustrated a typical mechanical adjuster which is suitable for the brake. As best shown in this view, the adjuster is generally designated as 47, and includes a screw 48 having a socketed head as shown in Fig. 1 or other appropriate provision for rotating the screw by a conventional tool. The screw 48 is threadedly extended through the power plate 10 and engages the primary disc 14 at its inboard end. A lock nut 49 is mounted on the screw to lock the screw in adjusted position after brake adjustment. Such adjustment is preferably accomplished by manually turning the screw 48 until the brake is manually fully applied, and thereafter backing out the screw 48 an amount equal to the desired predetermined running clearance of the brake. When so adjusted, the screw may be locked against rotation by jamming the nut 49 firmly against the outer face of the power plate.

Referring now to Figs. 4 and 5, these views show a modified brake assembly generally similar to that of Figs. 1 to 3, but primarily differing therefrom in the form of the brake releasing instrumentalities. In the modified construction of Figs. 4 and 5, these instrumentalities constitute a so-called "Belleville" spring designated 50 which is substituted for the coil springs 26 and materially simplifies the brake construction and assembly. As best seen in Fig. 5, it will be observed that the torque hub 8' has been modified by shortening its axial length and omitting the milled lugs on the outboard end thereof as illustrated in Figs. 1 to 3. On the other hand, the power plate 10' has also been slightly modified by omitting the stud bolt fastening means provided in the first form of the brake, and in lieu thereof, substituting hub splines 51 which interlock with the splines designated 9 on the wheel axle 2.

At the inboard side of the power plate 10', the power plate is provided with an axially extended portion of hub 52 which abuts against and forms a continuation of the outboard end of the torque hub 8', said hub 52 serving to pilot the "Belleville" spring 50 and thus maintain the spring in operative engagement with the flanged shoulder 23 on the primary disc 14. At the inboard side of the "Belleville" spring, a snap ring 53 is locked on the hub 52 and provides a stop or abutment against which the "Belleville" spring bears.

The function of the modified brake of Figs. 4 and 5 is generally similar to that of the form first described, and therefore need not be repeated herein. Except for the slight differences in the structure as specifically described above, the other component parts of the brake are identical with or similar to those of the first form and have been designated in Figs. 4 and 5 by identical reference characters.

While the specific details have been herein shown and described, the invention is not confined thereto as changes and alterations may be made without departing from the spirit thereof as defined in the appended claims.

We claim:

1. A friction device of the class described, comprising a plurality of coaxially arranged and normally axially spaced but relatively axially movable friction discs, certain of said friction discs being stationary and others being free for rotation and alternately interleaved with the stationary discs, a unitary hub member about which said friction discs are disposed and having provision for interlocking engagement with the stationary discs aforesaid, said hub member also having provision for interlocking engagement with a fixed wheel axle to preclude relative rotation between said hub member and the axle, a pair of relatively stationary coaxial plates respectively detachably disposed at opposite sides of the hub member and friction discs aforesaid, a primary actuator disc disposed for limited rotation intermediate one of said plates and the friction discs and axially movable towards and away from the latter plate for effecting frictional inter-engagement of said friction discs and the other plate, means for imparting axial movement to said primary disc, yieldable means for releasing said discs from inter-engagement with each other and with the last-mentioned plate to afford a normal running clearance therebetween, said yieldable releasing means comprising spring means cooperatively engageable with the axially movable primary actuator disc to normally urge said actuator disc towards the adjacent stationary plate and away from the friction discs, and means cooperative with the hub member for axially fixing said spring means and for restraining the same throughout its length against lateral displacement during engagement and release of the friction discs and their associated stationary plate and the primary actuator disk.

2. A friction device as defined in claim 1, wherein the primary actuator disc is freely suspended for limited rotative movement responsive to drag torque of the friction discs on initial engagement of the primary disc with the friction discs.

3. A friction device as defined in claim 1, wherein the primary actuator disc is freely suspended for limited rotative movement responsive to drag torque of the friction discs on initial engagement of the primary disc with the friction discs, and the means for imparting axial movement to the primary disc includes self-energizing camming means operable on the primary disc responsive to the drag torque aforesaid.

4. A friction device as defined in claim 1, wherein the means for imparting axial movement to the primary disc includes hydraulic operating means.

5. A friction device as defined in claim 1, wherein the means for imparting axial movement to the primary disc includes hydraulic operating means, said hydraulic operating means including a power plate disposed adjacent to the primary disc at the opposite side of the latter from the friction discs, said power plate having an annular piston chamber therein, and an annular piston in said chamber, said piston having operative thrust-engagement with said primary disc.

6. A friction device as defined in claim 1, wherein the means for imparting axial movement to the primary disc includes hydraulic operating means, said hydraulic operating means including a power plate disposed adjacent to the primary disc at the opposite side of the latter from the friction discs, said power plate having an annular piston chamber therein, and an annular piston in said chamber, said piston having operative thrust-engagement with said primary disc through an annular heat-insulating member disposed between the piston and the primary disc.

7. A disc brake of the class described, comprising a relatively stationary housing adapted to be mounted on a fixed support, said housing including a unitary hub and a pair of fixed laterally extended plates respectively disposed at the opposite ends of said hub, said plates each being detachably mounted, said hub having provision for interlocking engagement with a fixed wheel axle to preclude relative rotation between said hub and the axle, at least one friction disc rotatably mounted about said hub intermediate said plates and adapted to be connected with a rotatable part to be braked, a primary disc disposed between said friction disc and one of said fixed plates, said primary disc being freely movable axially relative to said hub and also free for limited rotation about said hub responsive to the drag torque of said rotatable friction disc when the primary disc is engaged therewith, self-energizing camming means between said primary disc and the last-mentioned fixed housing plate for axially shifting said primary disc towards and away from the rotary friction disc and the opposed fixed housing plate, responsive to the drag torque of the friction disc, actuator means for imparting an axial thrust to said primary disc to initially engage the latter with the friction disc, and axially fixed spring means disposed about the hub in coaxial relation thereto for normally urging the primary disc away from the rotary friction disc to release the brake, said spring means being so constructed and arranged as to impart a thrust to the primary disc in a direction perpendicular to the plane of the primary disc irrespective of angular rotation of the primary disc.

8. A disc brake as defined in claim 7, wherein the brake-releasing spring means comprises "Belleville" spring means operatively mounted upon and encircling the housing hub, one end of said spring means operatively abutting the primary disc and the other end of the spring being anchored against axial displacement.

9. A disc brake as defined in claim 7, wherein the brake-releasing spring means comprises "Belleville" spring means, operatively mounted upon and encircling the housing hub, one end of said spring means operatively abutting the primary disc and the other end of the spring being anchored against axial displacement on the hub, and said primary disc being piloted on the camming means.

10. A disc brake as defined in claim 7, wherein at least certain of the operative friction surfaces of the brake components are provided with a sintered metallic lining.

11. A disc brake as defined in claim 7, wherein at least certain of the operative friction surfaces of the brake components are provided with a sintered metallic lining having long-wearing and high heat conductivity characteristics.

12. A disc brake as defined in claim 7, wherein at least certain of the operative friction surfaces of the brake components are provided with a sintered metallic lining integrally bonded thereto.

13. A friction device of the class described, comprising a plurality of coaxially arranged and normally axially spaced but relatively axially movable friction discs, certain of said friction discs being stationary and others being free for rotation and alternately interleaved with the stationary discs, a pair of relatively stationary coaxial plates respectively disposed at opposite sides of the friction discs aforesaid, a slightly rotatable primary actuator disc intermediate one of said plates and the friction discs and axially movable towards and away from the latter plate for effecting frictional inter-engagement of said friction discs and the other plate, means for imparting axial movement to said primary disc, yieldable means for releasing said discs from inter-engagement with each other and with the last-mentioned plate to afford a normal running clearance therebetween, said yieldable releasing means comprising spring means including a plurality of coil springs spaced equidistantly apart about the axis of the plates and friction discs and cooperatively engageable with the axially and rotatably movable primary actuator disc to normally urge said actuator disc towards the adjacent stationary plate and away from the friction discs, and means for axially fixing said spring means and for restraining the same against lateral displacement throughout the length of each coil spring during engagement and release of the friction discs and their associated stationary plate and the primary actuator disc, said last-mentioned means including an axially movable rotatively fixed spring-retainer plate abutting against the primary disc and an axially disposed retainer means extending axially throughout the interior of each coil spring and bearing against said spring-retainer plate.

14. A disc brake of the class described, comprising a relatively stationary housing adapted to be mounted on a fixed support, said housing including a unitary hub and a pair of fixed laterally extended plates respectively disposed at the opposite ends of said hub, said hub having provision for interlocking engagement with a fixed wheel axle to preclude relative rotation between said hub and the axle, at least one friction disc rotatably mounted about said hub intermediate said plates and adapted to be connected with a rotatable part to be braked, a primary disc disposed between said friction disc and one of said fixed plates, said primary disc being freely movable axially relatively to said hub and also free for limited rotation about said hub responsive to the drag torque of said rotatable friction disc when the primary disc is engaged therewith, self-energizing camming means between said primary disc and the last-mentioned fixed housing plate for axially shifting said primary disc toward and away from the rotary friction disc and the opposed fixed housing plate responsive to the drag torque of the friction disc, actuator means for imparting an axial thrust to said primary disc to initially engage the latter with the friction disc, spring means disposed about the hub in coaxial relation thereto for normally urging the primary disc away from the rotary friction disc to release the brake, said spring means being so constructed and arranged as to impart a thrust to the primary disc in a direction perpendicular to the plane of the primary disc irrespective of angular rotation of the primary disc, and wherein the brake-releasing spring means comprises a plurality of coil springs equidistantly spaced apart about the housing hub, one end of each spring being operatively seated against a fixed member which is at the side of the rotary friction disc opposite to the primary disc, and the opposite end of each spring being operatively seated on an annular retainer member mounted at the opposite end of the hub, said retainer member being operatively engageable with the primary disc and freely shiftable axially on the hub, but being operatively interlocked with the hub to restrain the same against rotary movement relative thereto.

15. A disc brake of the class described, comprising a relatively stationary housing adapted to be mounted on a fixed support, said housing including a unitary hub and a pair of fixed laterally extended plates respectively disposed at the opposite ends of said hub, said hub having provision for interlocking engagement with a fixed wheel axle to preclude relative rotation between said hub and the axle, at least one friction disc rotatably mounted about said hub intermediate said plates and adapted to be connected with a rotatable part to be braked, a primary disc disposed between said friction disc and one of said fixed plates, said primary disc being freely movable axially relative to said hub and also free for limited rotation about said hub responsive to the drag torque of said rotatable friction disc and when the primary disc is engaged therewith, self-energizing camming means between said primary disc and the last-mentioned fixed housing plate for axially shifting said primary disc toward and away from the rotary friction disc and the opposed fixed housing plate responsive to the drag torque of the friction disc, actuator means for imparting an axial thrust to said primary disc to initially engage the latter with the friction disc, spring means disposed about the hub in coaxial relation thereto for normally urging the primary disc away from the rotary friction disc to release the brake, said spring means being so constructed and arranged as to impart a thrust to the primary disc in a direction perpendicular to the plane of the primary disc irrespective of angular rotation of the primary disc, and wherein the brake-releasing spring means comprises a plurality of coil springs equidistantly spaced apart about the housing hub, one end of each spring being operatively seated against the fixed housing plate which is at the side of the rotary friction disc opposite to the primary disc, and the opposite end of each spring being operatively seated on an annular retainer member mounted on the opposite end of the hub, said retainer member being operatively engageable with the primary disc and freely shiftable axially on the hub, but being operatively interlocked with the hub to restrain the same against rotary movement relative thereto, and said primary disc being piloted on the annular spring retainer and on the camming means.

References Cited in the file of this patent

UNITED STATES PATENTS

| | | |
|---|---|---|
| 1,989,179 | Verslius | Jan. 29, 1935 |
| 2,020,667 | Wahl | Nov. 12, 1935 |
| 2,063,443 | Lambert | Dec. 8, 1936 |
| 2,063,444 | Lambert | Dec. 8, 1936 |
| 2,099,489 | Lambert | Nov. 16, 1937 |
| 2,320,286 | Lambert | May 25, 1943 |
| 2,331,259 | Whitten | Oct. 5, 1943 |
| 2,375,855 | Lambert | May 15, 1945 |
| 2,519,865 | Wellman | Aug. 22, 1950 |
| 2,648,571 | Chapin | Aug. 11, 1953 |
| 2,671,532 | Du Bois | Mar. 9, 1954 |
| 2,816,630 | Kelley et al. | Dec. 17, 1957 |

FOREIGN PATENTS

| | | |
|---|---|---|
| 291,589 | Switzerland | June 30, 1953 |